(12) United States Patent
Kilroy et al.

(10) Patent No.: US 7,796,366 B2
(45) Date of Patent: Sep. 14, 2010

(54) AC ARC FAULT DETECTION AND PROTECTION

(75) Inventors: Donald G. Kilroy, Rockford, IL (US); Wayne H. Oldenburg, Roscoe, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 310 days.

(21) Appl. No.: 11/297,862

(22) Filed: Dec. 9, 2005

(65) Prior Publication Data
US 2007/0133134 A1 Jun. 14, 2007

(51) Int. Cl.
H02H 3/00 (2006.01)
(52) U.S. Cl. .......................................................... 361/42
(58) Field of Classification Search ................. 324/536, 324/544; 361/3, 14, 59
See application file for complete search history.

(56) References Cited

U.S. PATENT DOCUMENTS

| | | | | |
|---|---|---|---|---|
| 5,485,093 | A * | 1/1996 | Russell et al. | 324/522 |
| 6,532,424 | B1 * | 3/2003 | Haun et al. | 702/58 |
| 6,577,138 | B2 * | 6/2003 | Zuercher et al. | 324/536 |
| 6,943,558 | B2 * | 9/2005 | Hale et al. | 324/536 |
| 2003/0137309 | A1 | 7/2003 | Itimura et al. | |
| 2004/0066593 | A1 * | 4/2004 | Kolker et al. | 361/42 |
| 2004/0156154 | A1 | 8/2004 | Lazarovich | |
| 2005/0254187 | A1 | 11/2005 | Chu | |
| 2006/0245132 | A1 * | 11/2006 | Watanabe et al. | 361/90 |

FOREIGN PATENT DOCUMENTS

| | | |
|---|---|---|
| EP | 0 639 879 | 2/1995 |
| EP | 1 385 015 | 1/2004 |
| EP | 1 598 912 | 11/2005 |
| EP | 1 758 222 | 2/2007 |

OTHER PUBLICATIONS

Horowitz et al., The Art of Electronics, 2006, The Press Syndicate of the University of Cambridge, Second Edition, 229-232.*
European Search Report for EP Application No. 06256149.3 Mar. 3, 2010.

* cited by examiner

Primary Examiner—Stephen W Jackson
Assistant Examiner—Tien Mai
(74) Attorney, Agent, or Firm—Carlson, Gaskey & Olds, P.C.

(57) ABSTRACT

An AC arc fault device and methodology includes acquiring a signal in response to an AC current and defining overcurrent regions that correspond to the alternating directions of the AC current and a normal region. A software module identifies a parallel AC arc event over a selected time period in response to multiple occurrences of the acquired signal moving into one of the overcurrent regions. The software module also determines average current values over multiple selected time periods and identifies a series AC arc event in response to the difference between the average values exceeding a pre-determined threshold.

29 Claims, 8 Drawing Sheets

AC ARC FAULT DETECTION AND PROTECTION

BACKGROUND OF THE INVENTION

This invention relates to identification of electrical arc faults and, more particularly, to methodology for identifying the occurrence of AC arc events.

Conventional electrical systems that utilize electrical wiring, equipment, and related interconnections may degrade with time, temperature, moisture, vibration, or other environmental conditions. Degradation of electrical wire insulation, for example, can result in electrical events that increase an operating temperature of the electrical system and, in extreme conditions, lead to fire.

Conventional electrical systems typically employ an electrical protection device to protect from such electrical events that typically result in relatively large spikes in electric current. A thermal circuit breaker, for example, trips to open the circuit when a current sensing element temperature exceeds a predetermined temperature level. Alternatively, a solid-state power controller ("SSPC") monitors electrical current and trips if the current exceeds a preset energy rating.

Particular electrical events, such as electrical arcing, can be inherently low impedance and occur infrequently. This infrequent occurrence will prevent a thermal circuit breaker from reaching the predetermined temperature level or an SSPC from reaching a preset energy rating. As a result, conventional thermal circuit breakers and solid-state power controllers typically do not trip when an electric arc occurs, even though it is desirable to detect electric arc events for purposes such as identifying an electrical problem and preventing the problem from causing additional damage.

Several electrical protection devices attempt to address electric arc detection. An additional hard-wired arc-detecting circuit, for example, may be utilized in conjunction with the thermal circuit breaker to detect an AC electric arc and initiate a trip electro-mechanically. Likewise, an additional hard-wired arc-detecting circuit may be utilized in conjunction with a solid-state power controller to detect an AC electric arc and initiate a trip. Use of hard-wired circuitry may increase the size and weight of the electrical protection device and add expense.

Alternatively, other devices attempt to provide a "one size fits all" approach to identifying electrical arc faults. These types of devices purport to identify electrical arc events for both DC and AC electrical power by comparing electric current with known acceptable load currents and generate a fault signal if the comparison is undesirable. However, since DC and AC electrical power is inherently different, these devices and methodologies inherently overlook the differences between DC and AC in identifying electric arc faults. Furthermore, these devices and methodologies lack intelligence capability to accurately disregard transient electrical events, characterize an electrical arc event, or identify an arc event based on the DC or AC nature of the electrical current, for example.

Accordingly, there is a need for a compact, inexpensive, and intelligent device and methodology to identify AC electric arc events.

SUMMARY OF THE INVENTION

A method of parallel AC arc event detection according to the present invention includes acquiring a signal representing an AC current and defining a first overcurrent region for positive half cycles, a second overcurrent region for negative half cycles, and a normal region. A software module monitors the acquired signal and identifies signal peaks. The software module identifies a parallel AC arc fault over a selected time period in response to multiple occurrences of the signal moving from the normal region to one of the first overcurrent region or the second overcurrent region. An absolute value or full wave rectification of the AC current may be used such that the overcurrent regions are identical.

A method of series AC arc fault detection according to the present invention includes acquiring a signal representing an AC current over multiple selected time periods and determining an average signal value for each time period. A software module then compares the average signal values to each other. If the average signal values differ by more than a predetermined amount, the software module identifies a series AC arc event.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
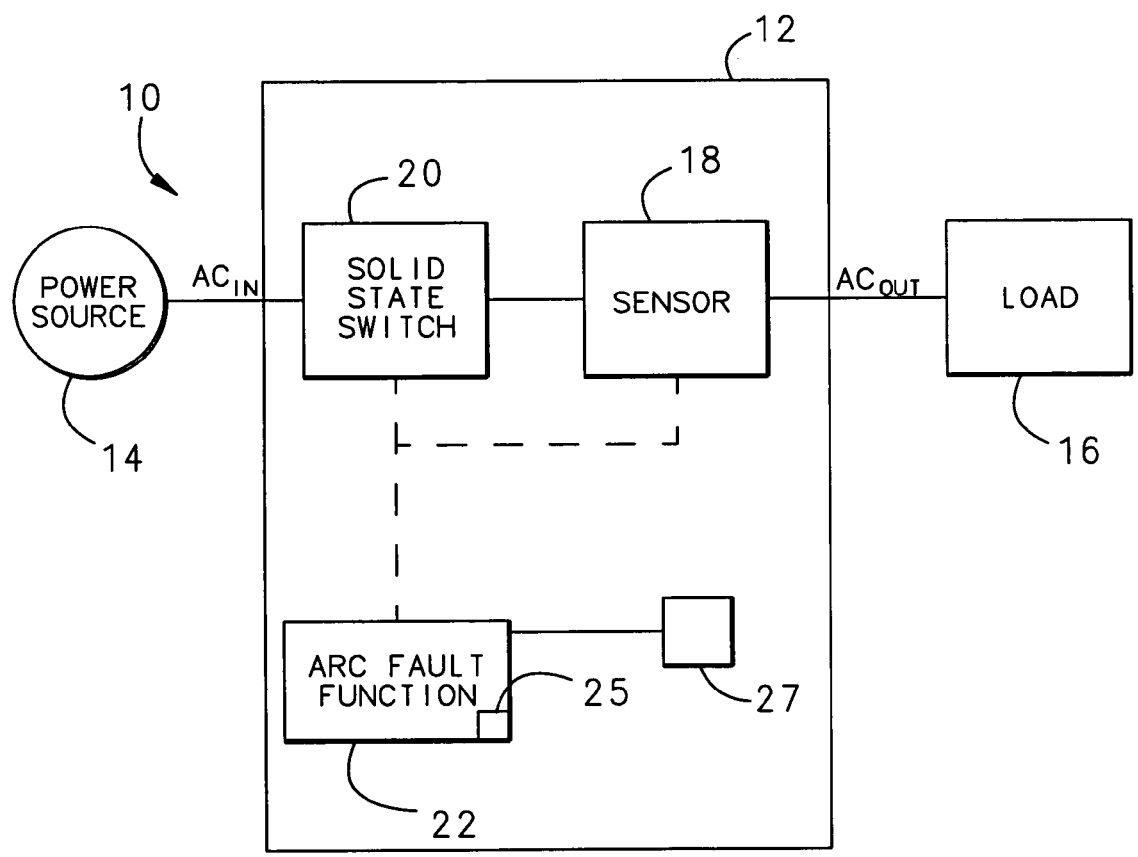
FIG. 1 schematically illustrates an example of a simplified electrical system utilizing a software module that detects AC arc faults.

FIG. 1 illustrates selected portions of an example electrical system 10 having a solid-state power controller 12 that receives AC electrical power from a power source 14. The solid-state power controller 12 includes a sensor 18 for sensing the AC electrical current and a solid-state switch 20 for selectively switching AC electrical power to a desired load 16.

A software module 22 is integrally connected in electrical communication with the sensor 18 and the solid-state switch 20. The software module 22 acquires a signal representing the AC electrical current and analyzes the signal to identify occurrences of AC arc faults, as will be described below.

The software module 22 includes a digital counter 25, such as an accumulator, and is capable of annunciating the fault through a communication interface such as a serial communication interface, other known interface, or with an indicator 27.

Figure 2:
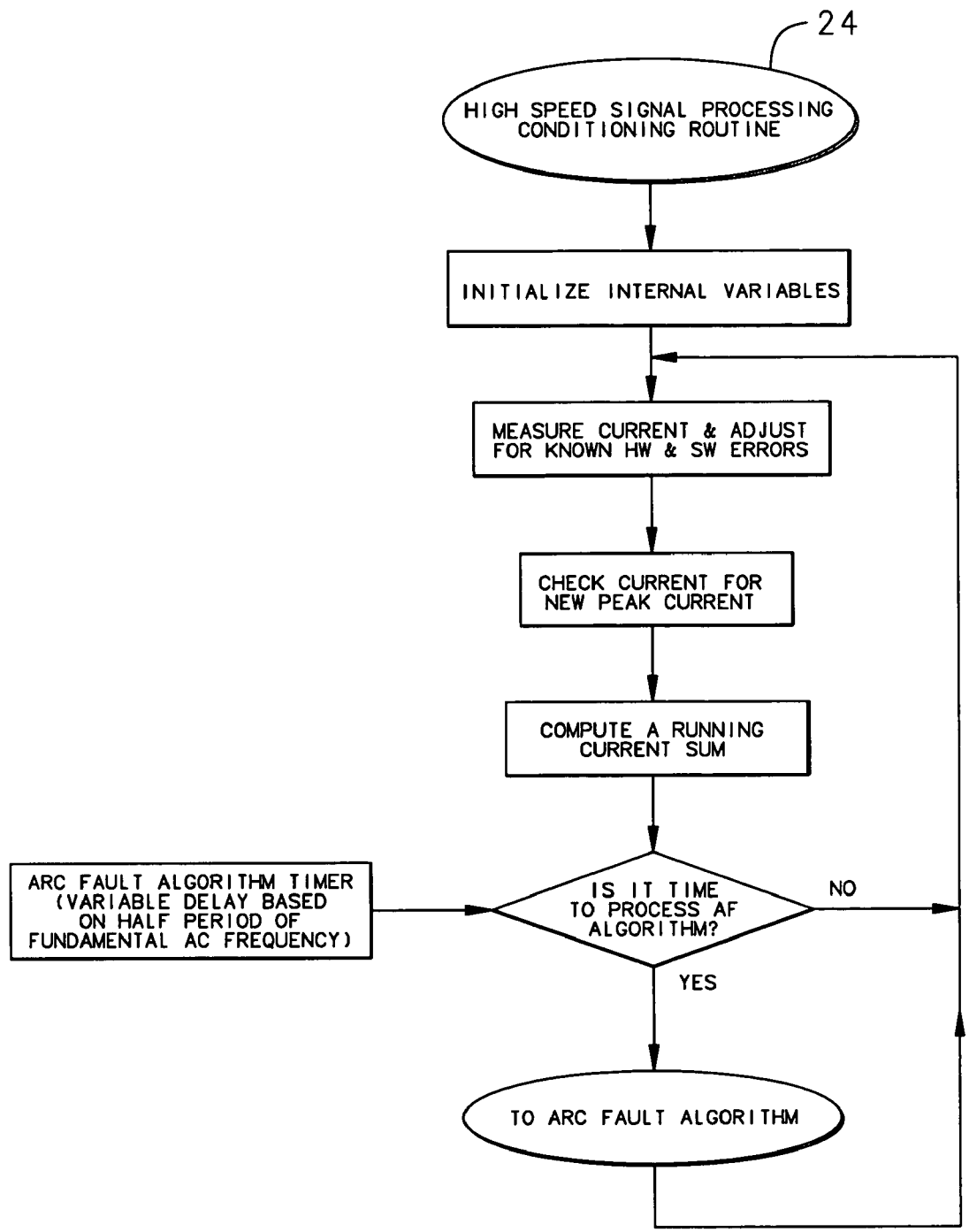
FIG. 2 illustrates an algorithm utilized by the software module of FIG. 1 for acquiring an AC signal.

Referring to FIG. 2, the software module 22 acquires the signal in a generally known manner, which includes high speed signal processing and conditioning shown starting at step 24.

Figure 3:
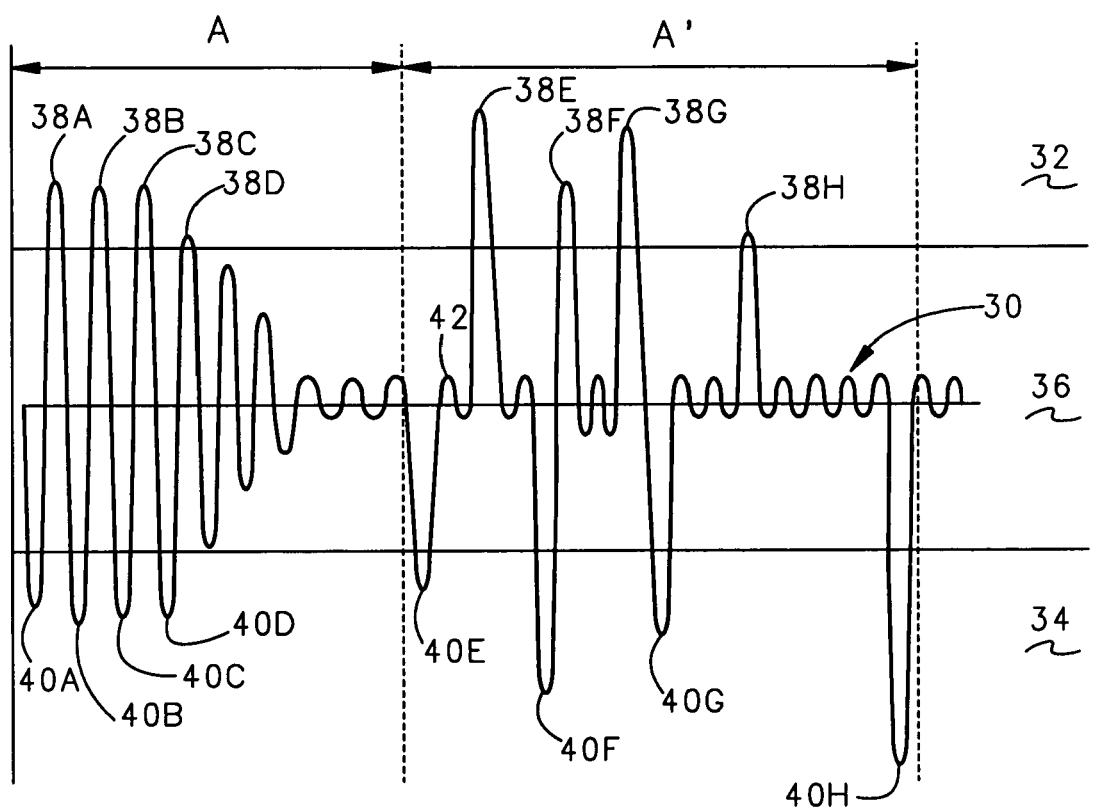
FIG. 3 shows an acquired signal and determination of parallel AC arc events or faults.

FIG. 3 shows parallel AC arc event detection. The software module 22 acquires and analyzes a signal 30 to identify both parallel and series AC arc events. A parallel AC arc fault refers to a predetermined number of AC arc events within a selected time period. A series AC arc fault refers to change in average AC electrical current values over several selected time periods. The example electrical system 10 (FIG. 1) provides the benefit of utilizing a single sensor 18 for both overcurrent protection and arc event or fault protection.

In the illustration, the signal 30 represents the AC electrical current versus time. A user establishes a first overcurrent region 32, which corresponds to AC current over a positive half-cycle, and a second overcurrent region 34 corresponding to AC current in a negative half-cycle. A normal region 36 is located between the first overcurrent region 32 and the second overcurrent region 34.

In one example, the regions 32, 34, 36 correspond to a device rating of the solid-state power controller 12, such as a percentage of the device rating. Alternatively, the regions 32, 34, and 36 can be selected to correspond to other desired AC electrical power levels. The regions 32, 34, and 36 can also be dynamically changed during operation to increase or decrease the arc fault or event sensitivity.

The software module 22 monitors the signal 30 and identifies peaks within the first and second overcurrent regions 32 and 34. In this example, the signal 30 includes peaks 38A, 38B, 38C, and 38D in the first overcurrent region 32 and peaks 40A, 40B, 40C, and 40D in the second overcurrent region 34 within time period A. The time period A can be a fixed period, sliding period, or other desired time period.

The software module 22 monitors the positive and negative half cycles of the signal 30 (zero cross to zero cross) for signal 30 peaks in the overcurrent regions 32 or 34 with a peak in the normal region 36 between them. Peaks having a "signature" of overcurrent, normal, followed by overcurrent are identified as an arc event.

In time period A, the signal 30 extends into the first overcurrent region 32 at each of the peaks 38A, 38B, 38C, and 38D and into the second overcurrent region 34 at each of the peaks 40A, 40B, 40C, and 40D.

The software module 22 identifies an AC arc event in response to multiple occurrences of the signal moving out of the normal region 36 to one of the overcurrent regions 32 or 34 in a non-consecutive manner (i.e., an overcurrent peak, a normal peak, and another overcurrent peak). In one example, if this "signature" is obtained, then all previous overcurrents in the time period are arc events and all future overcurrents in the time period are arc events.

The excursions into the overcurrent regions 32 and 34 may be successive positive and negative half-cycles without being an arc event. In time period A, an AC arc event does not occur when the signal 30 moves from the normal region 36 to the peak at 40A in the second overcurrent region 34, back into the normal region 36, and then to the peak at 38B in the first overcurrent region 32 because the signal 30 did not exhibit the overcurrent, normal, overcurrent peak "signature." Time period A represents a normal inrush load characteristic, so the software module 22 does not identify an arc fault.

As shown by the time period A', the signal 30 includes peaks 38E, 38F, 38G, and 38H in the first overcurrent region 32 and peaks 40E, 40F, 40G, and 40H in the second overcurrent region 34. For this example, the software module 22 identifies an AC arc event when the signal 30 moves from the peak at 40E in the second overcurrent region 34, back into the normal region 36 for at least one normal peak 42, and then to the peak at 38E in the first overcurrent region 32. In another example, the software module 22 identifies an AC arc event when more than one normal peak occurs between peaks in the overcurrent regions 32, 34. Successive positive and negative half-cycles into the overcurrent regions 32 and 34 as shown in peak 38G and 40F will be counted as arc events as long as the overcurrent, normal, overcurrent "signature" occurs anywhere in the same time period. If a predetermined number of the AC arc events occur in time period A', the software module 22 identifies an arc fault.

Figure 4:
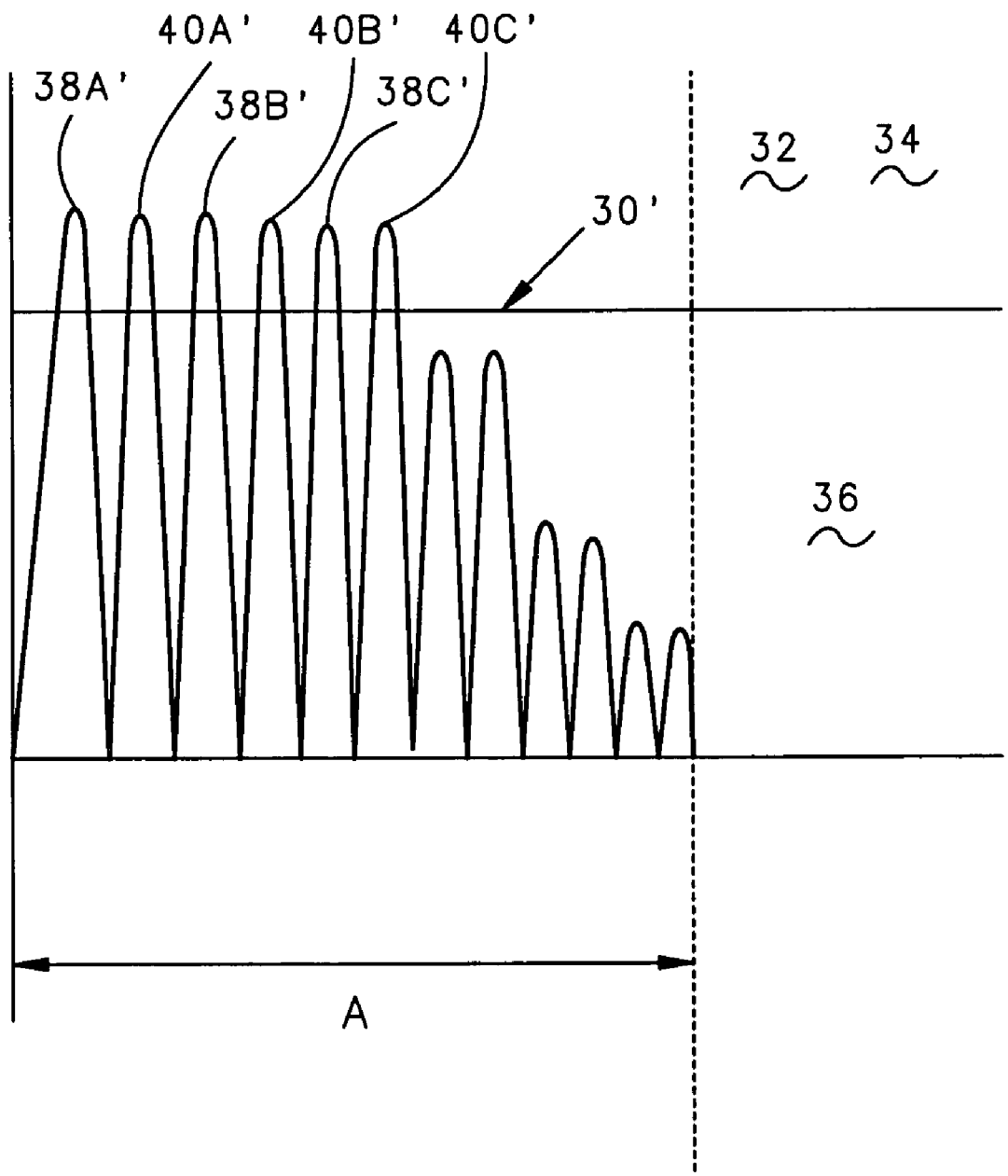
FIG. 4 shows utilizing an absolute value of the AC current.

Referring to FIG. 4, an absolute value or full wave rectification of the AC current is used to generate a signal 30'. In this example, the negative half-cycles are made positive by the absolute value function. This results in the first overcurrent region 32 and the second overcurrent region 34 being equivalent.

Figure 5:
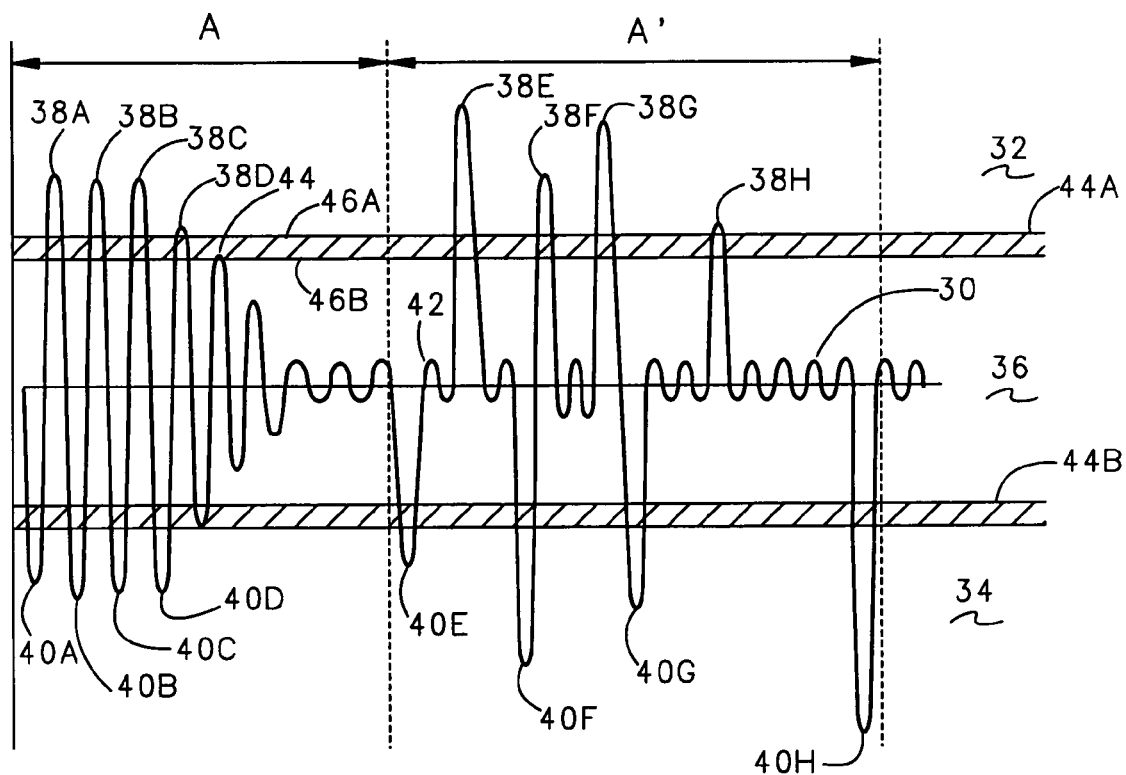
FIG. 5 shows dead zone regions between a normal current region and overcurrent regions.

Referring to another example shown in FIG. 5, dead zone regions 44A and 44B are used between the normal region 36 and the respective overcurrent regions 32 and 34. The dead zone regions 44A and 44B provide the benefit of protecting against slowly changing current near the boundary of the normal region 36 and overcurrent regions 32 and 34.

In one example, the signal 30 must move completely above or below the dead zone regions 44A or 44B to be in the respective overcurrent regions 32 or 34. A peak 44 within the dead zone region 44A is not detected as an overcurrent peak or normal peak because it does not extend above an upper boundary 46a or below a lower boundary 46b of the dead zone region 44A.

identifying AC arc faults through an accumulation of arc fault events within a time period avoids identifying arc faults during normal load inrush conditions (as illustrated in time period A' of FIGS. 3 and 5). Additionally, in one example, determining an AC arc fault with this approach avoids identifying arc faults based upon a rate of change of the current, although it is contemplated that the inventive approach could be utilized in combination with previously known methodologies. Additionally, in another example, the electrical system 10 need not include the conventionally required hardwire circuitry for identification of AC arc faults that may be required with the rate of change approach.

Identifying an AC arc fault through multiple excursions of the signal 30 into one of the overcurrent regions 32 or 34 provides for identification of AC arc events and may not be ideally suited for DC arc event or fault identification. Unlike AC electrical power, DC electrical power has no regular cycle of changing current direction.

Upon identifying an AC arc event, or alternatively a predetermined number of AC arc events (i.e., an arc fault) within a selected time period, the software module 22 selects an output action from one of several available output actions. One possible output action is to open the solid-state switch 20 to prevent AC electrical power from being connected to the load 16. This provides the advantage of isolating an AC arc fault downstream from the solid-state power controller 12.

Another possible output action is to send an AC arc event or fault signal to the indicator 27 to indicate, for example, to a vehicle occupant that there is a potential electrical problem. During this time, the solid-state power controller 12 continues to connect AC electrical power to the load 16; however, the indicator 27 indicates a potential electrical problem. Alternatively, software module 22 takes no output action in response to detection of the AC arc event or fault.

Selecting from one of several output actions provides the benefit of configuring the electrical system so that each solid-state power controller responds in a preselected manner to detected AC arc events or faults.

Figure 6:
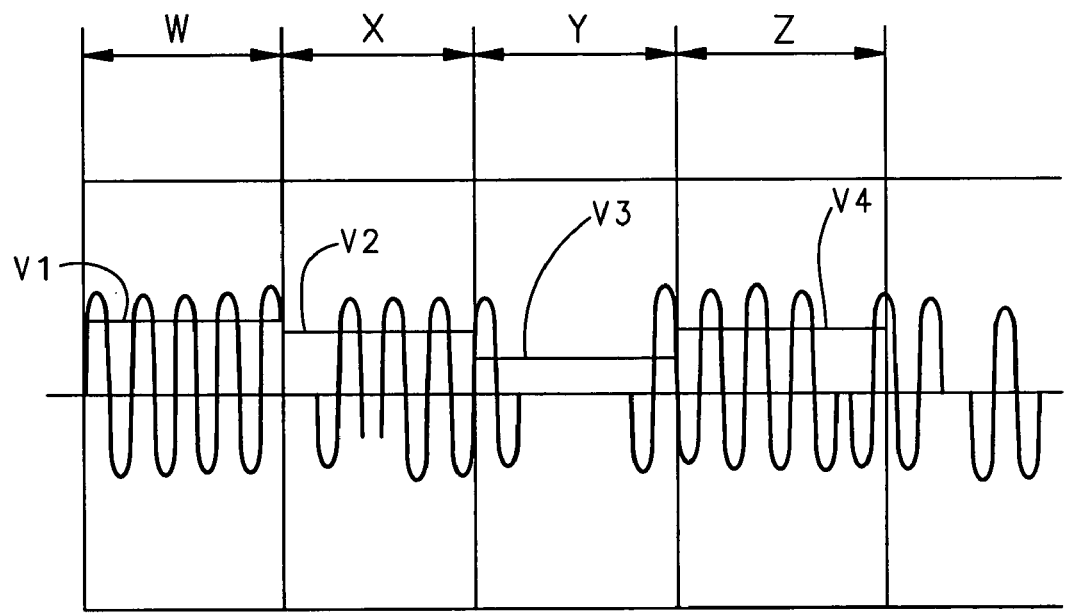
FIG. 6 shows an acquired signal and determination of a series AC arc events or faults.

Referring to FIG. 6, the software module 22 integrates the signal 30 over time to determine an average signal value for series arc event detection in conjunction with the parallel arc event detection described above. The time average can be based on any portion of the AC current waveform or on multiple cycles of AC current waveform. In the illustration, the software module 22 determines an average signal value $V_1$ for time period W and an average signal value $V_2$ for time period X. The software module 22 compares the average signal value $V_1$ to the average signal value $V_2$. If a difference between the average signal value $V_1$ and the average signal value $V_2$ exceeds a predetermined threshold, the software module 22 increases a value of the digital counter 25 (FIG. 1), which represents a series AC arc event.

The software module 22 determines a third average signal value $V_3$ for time period Y and compares it to the second average signal value $V_2$ for time period X. If the difference exceeds the predetermined threshold, the software module 22 again increases the value of the digital counter 25.

A fourth average signal value $V_4$ for time period Z is compared to the third average signal value $V_3$. The average signal values $V_4$ is greater than $V_3$. In response, the software module 22 decreases the value of the digital counter 25. The software module also would decrease the value of the digital counter 25 if $V_4$ were equal to $V_3$.

Optionally, a minimum current qualifier can be included to prevent nuisance AC arc fault series protection due to very small currents.

Optionally, the magnitudes of the values that the software module increases or decreases the digital counter 25 may be made unequal to achieve a fast charge, slow discharge integration.

The digital counter 25 exceeding a predetermined threshold represents a series AC arc fault condition. The software module 22 then selects one of the several output actions, as described above.

Utilizing the software module 22 to identify both parallel and series AC arc fault events provides the advantage of characterizing electrical problems within the electrical system 10. For example, parallel AC arc events often correspond to electrical problems within a wire bundle, while series AC arc events often correspond to a loose connection. This enables the software module 22 to characterize electrical problems and respond in a desired manner through one of the predefined output actions.

Utilizing the software module 22 rather than a separate electrical or electro-mechanical circuit further provides the advantage of being able to adapt to changing frequencies from the power source 14 and differing loads 16 within the electrical system 10. In one example, the time periods are pre-selected intervals and are not dependent upon the frequency of the current. Furthermore, the software-based methodology disclosed is robust enough to maintain AC arc fault monitoring capability if the software becomes corrupted by single event upsets, such as bit flipping from cosmic radiation, etc, and does not passively fail as long as current is sensed.

Figure 7:
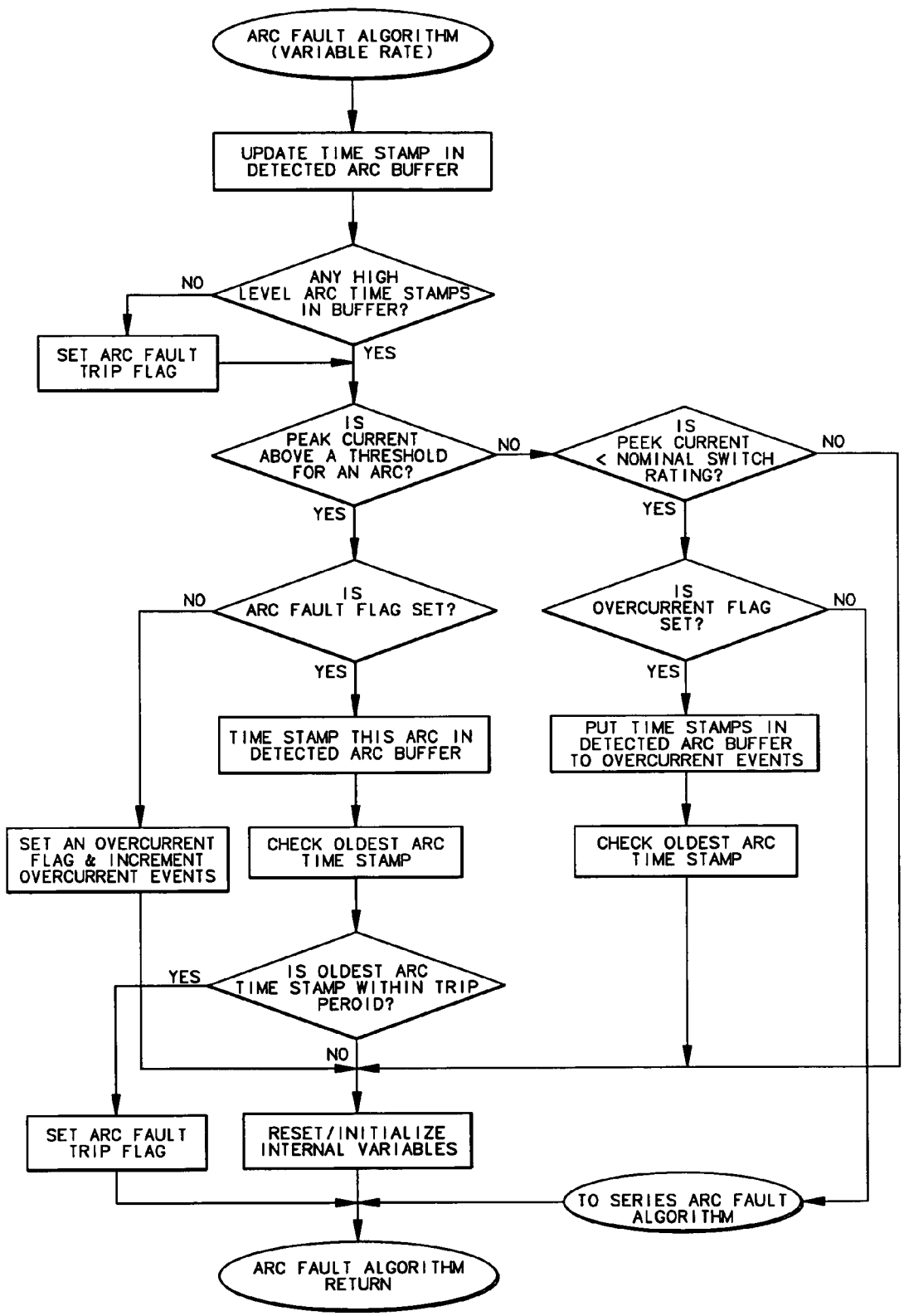
FIG. 7 shows an example algorithm for parallel AC arc fault determination.

FIG. 7 shows an example algorithm for identifying a parallel AC arc fault as described above. Although the example shows specific steps, given this description, one of ordinary skill in the art might recognize alternative steps to achieve parallel AC arc fault detection.

Figure 8:
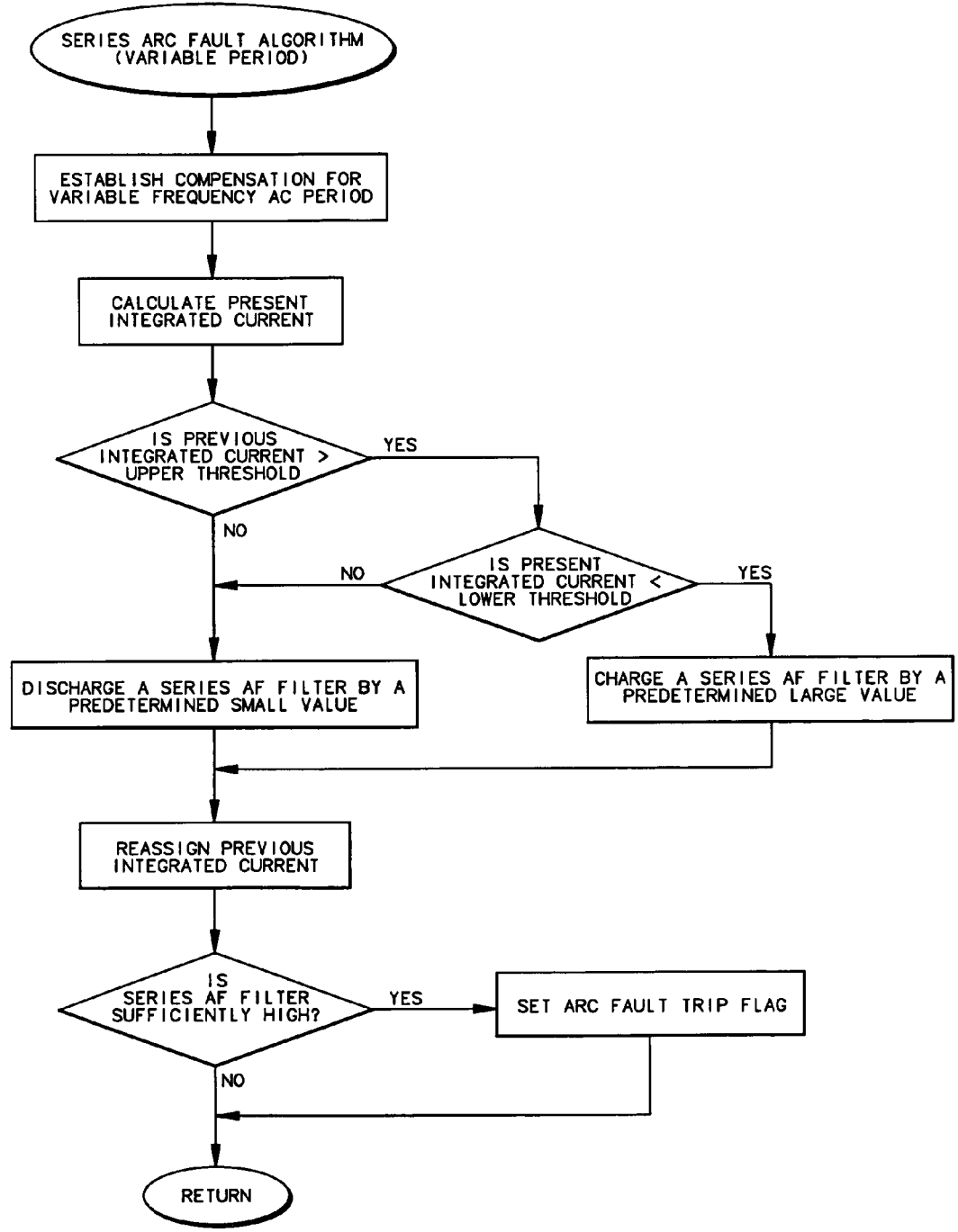
FIG. 8 shows an example algorithm for series AC arc fault determination.

FIG. 8 shows an example algorithm for detecting a series AC arc fault. Although a specific algorithm is shown, given this description, one of ordinary skill in the art might recognize alternative steps to achieve series AC arc fault detection.

Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. A method of alternating current (AC) arc event detection, comprising:
    (a) a controller determining a signal in response to a current that alternates between positive and negative half-cycles;
    (b) the controller defining a first overcurrent region that corresponds to the positive half-cycle, a second overcurrent region that corresponds to the negative half-cycle, and a normal current region; and
    (c) the controller defining an AC arc event over a selected time period in response to a plurality of occurrences of the signal moving from the normal region to one of the first overcurrent region or the second overcurrent region and moving from the normal region to another of the first overcurrent region or the second overcurrent region.

2. The method as recited in claim 1, wherein said step (c) includes identifying a first signal peak within one of the first overcurrent region or the second overcurrent region, identifying a second signal peak in the normal region, and identifying a third signal peak in one of the first overcurrent region or the second overcurrent region.

3. The method as recited in claim 1, wherein said step (b) includes defining the normal current region based upon a percentage of a device rating of a device that switches the current.

4. The method as recited in claim 1, including step (d) the controller commanding a solid-state switch to open in response to defining the AC arc event in said step (c).

5. The method as recited in claim 2, including step (d) defining all peaks in the first overcurrent region and the second overcurrent region within the selected time period as additional AC arc events.

6. The method as recited in claim 5, including step (e) the controller commanding a solid-state switch to open in response to a threshold number of second AC arc events in step (d).

7. The method as recited in claim 1, including step (d) providing an indication of the AC arc event of step (c).

8. The method as recited in claim 1, including (d) maintaining a solid-state switch in a closed state in response to defining the AC arc event in said step (c).

9. The method as recited in claim 1, including step (d) determining a first average signal value over the predetermined time period and a second average signal value over at least one additional time period and identifying a series AC arc event in response to a comparison of the average signal values.

10. The method as recited in claim 9, including step (e) selecting one of a plurality of output actions in response to identifying the series AC arc fault.

11. The method as recited in claim 1, including step (d) determining the selected time period independently of a frequency of the current.

12. The method as recited in claim 1, wherein step (b) includes defining the second overcurrent region to correspond to an absolute value of the current over the negative half-cycle.

13. The method as recited in claim 1, including step (d) defining a dead zone region between the normal current region and at least one of the first overcurrent region or the second overcurrent region.

14. The method of claim 1, including step (d) establishing an amplitude of the signal and determining whether the signal has moved from the normal region to one of the first overcurrent region or the second overcurrent region based on the amplitude.

15. The method of claim 1, wherein said step (c) includes defining an AC arc event in response to a plurality of normal peaks occurring between peaks in at least one of the first overcurrent region and the second overcurrent region.

16. The method as recited in claim 2, including step (d) defining all peaks in the first overcurrent region and the second overcurrent region within the selected time period as additional AC arc events in response to detection of an overcurrent signature.

17. The method of claim 1, wherein said first overcurrent region comprises only positive overcurrent values, and said second overcurrent region comprises only negative overcurrent values.

18. The method of claim 1, wherein said first and second overcurrent regions are separated by a normal current region.

19. A method of alternating current (AC) arc fault detection, comprising:
  (a) a controller acquiring a signal representing an alternating electric current over multiple selected time periods;
  (b) the controller determining a value for each selected time period in response to the signal;
  (c) the controller defining an AC arc event based at least partially upon the values in response to a plurality of occurrences of the signal moving from the normal region to one of the first overcurrent region or the second overcurrent region and moving from the normal region to another of the first overcurrent region or the second overcurrent region;
  (d) the controller adding a first value to a counter if a difference between values exceeds a predetermined threshold; and
  (e) the controller subtracting a second value that is smaller than the first value from the counter if the difference does not exceed the predetermined value.

20. The method as recited in claim 19, wherein said step (b) includes determining the value based upon an average signal value over one of the multiple selected time periods.

21. The method as recited in claim 19, including (d) commanding a solid-state switch to one of an open or closed state in response to defining the AC arc event in said step (c).

22. A device for detecting AC arc faults comprising:
  a solid-state switch that selectively transmits alternating current electrical power; and
  a software module that receives a signal representing said alternating current electrical power over a selected time period and identifies an arc event over the selected time period in response to a first signal peak in one of a first overcurrent region or a second overcurrent region, a second signal peak in a normal region, and a third signal peak in another of the first overcurrent region or the second overcurrent region, wherein said software module selects one of a plurality of output actions in response to said arc event.

23. The device as recited in claim 22, wherein said software module acquires said signal over multiple selected time periods and commands the solid-state switch to an open state in response to an average signal value for each time period.

24. The device as recited in claim 23, wherein said software module includes a digital counter that increases by a first fixed value if a difference between the average signal values exceeds a predetermined threshold.

25. The device as recited in claim 24, wherein said digital counter decreases by a second value that is smaller than the first value if the difference does not exceed the predetermined value.

26. The device of claim 22, wherein the software module dynamically controls a magnitude of at least one of the first overcurrent region, the second overcurrent region, or the normal current region during operation of the device to alter an arc fault sensitivity of the device.

27. The device of claim 22, wherein the device measures an amplitude of the signal to determine a signal peak in the first overcurrent region, the second overcurrent region, or the normal region.

28. The device of claim 22, wherein said first overcurrent region comprises only positive overcurrent values, and said second overcurrent region comprises only negative overcurrent values.

29. The device of claim 22, wherein said first and second overcurrent regions are separated by a normal current region.

* * * * *